(12) United States Patent
Ciancio-Bunch et al.

(10) Patent No.: US 9,613,085 B2
(45) Date of Patent: Apr. 4, 2017

(54) SYSTEM AND METHOD TO GENERATE A DATA-RICH TEMPLATE

(71) Applicant: ExactTarget, Inc., Indianapolis, IN (US)

(72) Inventors: Michael Ciancio-Bunch, Columbus, IN (US); Tom Waltz, Carmel, IN (US); Greg Curiel, Portage, IN (US); Gerald Gibson, Avon, IN (US); Dale McCrory, Avon, IN (US); Kevin Parkerson, Indianapolis, IN (US); Matt Beard, Carmel, IN (US)

(73) Assignee: SALESFORCE.COM, INC., San Francisco, CA (US)

( * ) Notice: Subject to any disclaimer, the term of this patent is extended or adjusted under 35 U.S.C. 154(b) by 352 days.

(21) Appl. No.: 14/054,317

(22) Filed: Oct. 15, 2013

(65) Prior Publication Data

US 2014/0108443 A1 Apr. 17, 2014

Related U.S. Application Data

(60) Provisional application No. 61/714,069, filed on Oct. 15, 2012.

(51) Int. Cl.
*G06F 17/30* (2006.01)

(52) U.S. Cl.
CPC .. *G06F 17/30386* (2013.01); *G06F 17/30873* (2013.01)

(58) Field of Classification Search
None
See application file for complete search history.

(56) References Cited

U.S. PATENT DOCUMENTS

| | | | |
|---|---|---|---|
| 6,944,817 B1 * | 9/2005 | Danneels | G06F 17/30867 707/999.001 |
| 2003/0115548 A1 * | 6/2003 | Melgar | G06F 8/30 715/234 |
| 2007/0277099 A1 * | 11/2007 | Nakayama | G06F 17/243 715/234 |
| 2012/0110002 A1 * | 5/2012 | Giambalvo | G06F 17/30572 707/769 |
| 2013/0151943 A1 * | 6/2013 | Zhu | G06F 17/30905 715/234 |
| 2014/0032484 A1 * | 1/2014 | Cameron | G06F 17/30014 707/607 |

* cited by examiner

*Primary Examiner* — Bai D. Vu
(74) *Attorney, Agent, or Firm* — Morris & Kamlay LLP

(57) ABSTRACT

A computerized method and system for correlating template data to select contextually relevant content including receiving a request from a consumer device to serve a template at a server, the template comprising at least one tag, selecting a content in a database associated with the at least one tag based at least in part on a correlation between the template and the at least one tag, substituting the at least one tag with the content, and transmitting the template from the server to the consumer device.

21 Claims, 7 Drawing Sheets

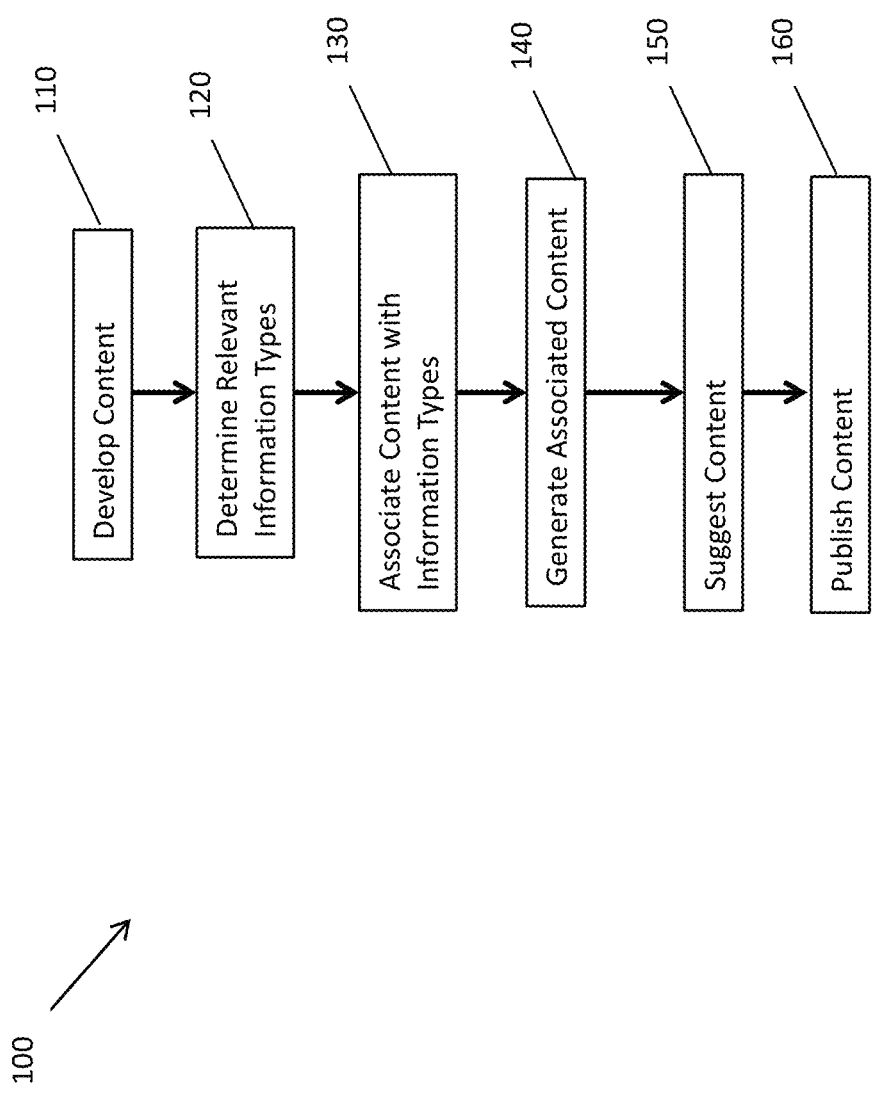

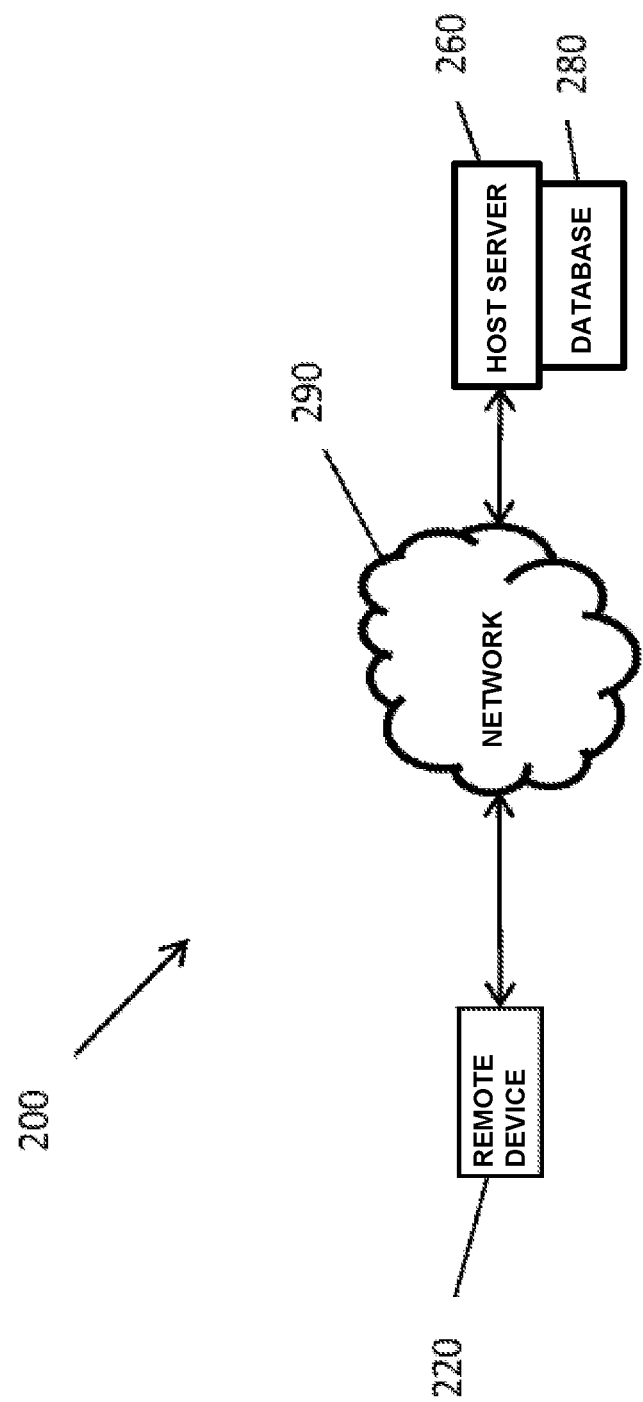

SYSTEM AND METHOD TO GENERATE A DATA-RICH TEMPLATE

PRIORITY

This application claims priority to and the benefit of U.S. Provisional Application No. 61/714,069, filed on Oct. 15, 2012 which is incorporated herein by reference.

BACKGROUND

Enterprises interested in engaging their customers and attracting new customers utilize Internet-based marketing campaigns that communicate with such customers over multiple channels. With the establishment of social media and the ever-increasing adoption of mobile devices, the amount of information available to such customers is vast and the amount of time in which such information is relevant continues to become shorter. As such, enterprises must quickly communicate content to such customers before the message within such content is no longer relevant.

Today, enterprises may create Internet-based content somewhat quickly through the use of various template languages, such as, for example, Mustache and Handlebars. These template languages enable an enterprise to use content-based variables and other pre-defined sets of information to quickly generate web-based content in HTML, JavaScript, and other languages.

Nevertheless, current template languages suffer from the inability to automatically make connections between content being generated by an enterprise and information associated with such content stored within an information store. Additionally, current template languages lack the ability to automatically determine what type of communication is being developed and automatically populate a pre-defined template for such communication that already references previously stored information variables.

Accordingly, there exists a need for a system, method, and non-transitory computer-readable medium that enables enterprises to generate communications to their customers more quickly by automatically associating data within an information store and suggesting previously defined layouts to an enterprise during the content-creation process. Indeed, there exists a need for a system, method, and computer-readable medium that quickens the development process for communications by pre-populating at least portions of developed communications based on the type of communication being developed and the type of information being referenced in the communication.

BRIEF DESCRIPTION OF THE DRAWINGS

FIG. 1 displays a flowchart of a method for generation of a data-rich template according to at least one embodiment of the present disclosure.

FIG. 2 displays components in an architecture of a system for generation of a data-rich template according to at least one embodiment of the present disclosure.

DETAILED DESCRIPTION

Figure 3A:
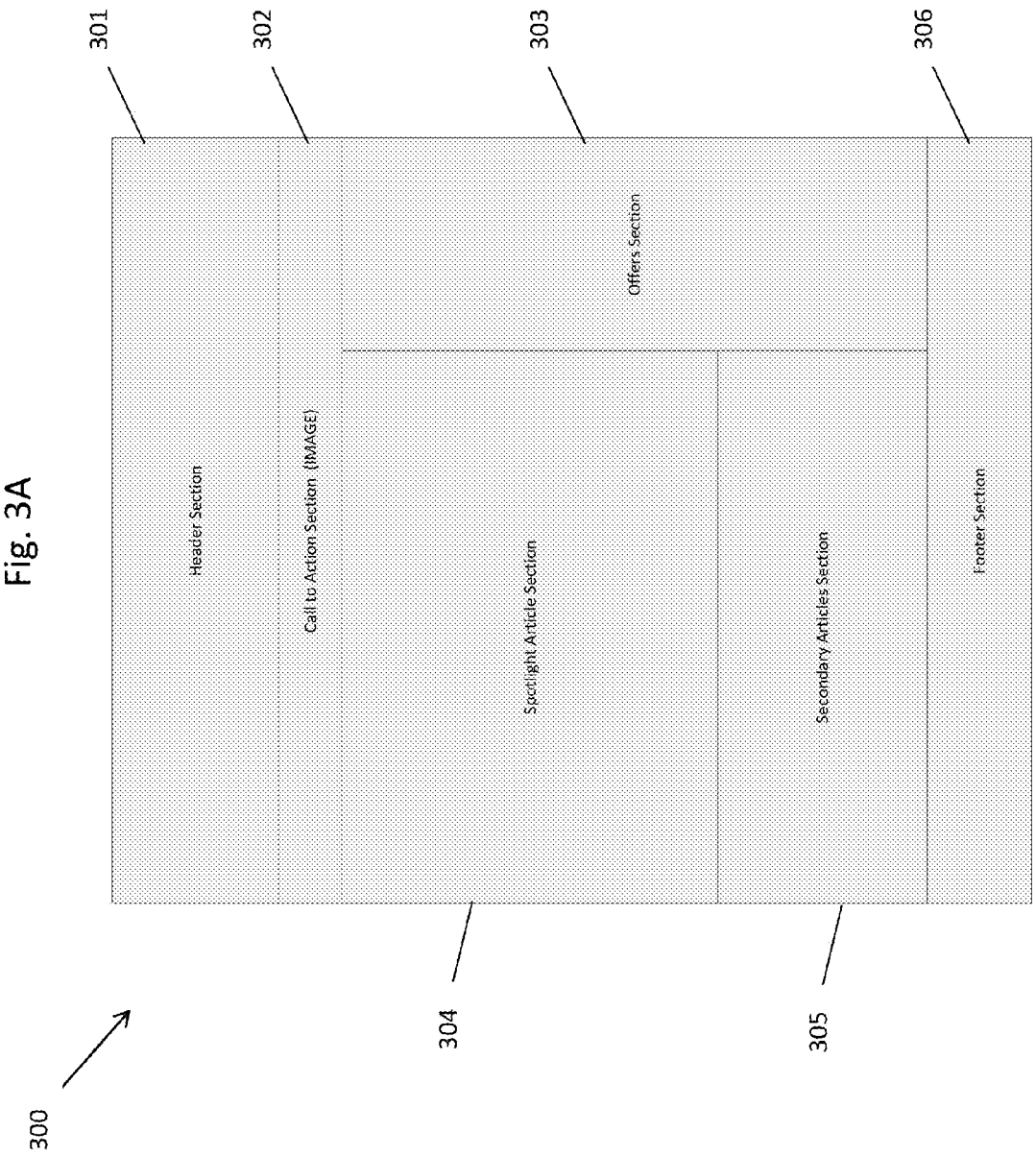
FIGS. 3A-3E display a wireframe template of a graphical user interface generated through execution of a computer-readable medium for generation of a data-rich template according to at least one embodiment of the present disclosure.

In the present disclosure, a system, method, and non-transitory computer-readable medium for generating a data-rich template is disclosed. The system, method, and non-transitory computer-readable medium enables an enterprise to input content and automatically associate such content with previously obtained information, previously defined information types, or pre-built layouts relevant to the content. As used in the present disclosure, content may refer to, but is not limited to, web and/or mobile browser-interpretable language that renders video, text, information, input fields, templates, links, and other types of browser-viewable data when viewed in a web browser. As used in the present disclosure, web and/or mobile browser interpretable language includes, but is not limited to, Ruby, JavaScript, Python, Erlang, PHP, Perl, Objective-C, Java, .NET, C++, Go, Lua, ooc, ActionScript, ColdFusion, Scala, Clojure, Fantom, CoffeeScript, D, and any other language able to render information when viewed in a web browser or extensions to such languages to render information, such as, for example, Handlebars and Mustache. It should be appreciated that it is within the scope of the present disclosure that web and/or mobile browser interpretable languages may be configured to support specific user devices and/or user operating systems, such as, for example Java for Android, C for iOS, and other device-specific distributions. It should be noted that the method, system, and non-transitory computer-readable medium for generating a data-rich template of the present disclosure may be used along with or to complement one or more programs.

Referring now to FIG. 1, it is shown a method to generate a data-rich template according to at least one embodiment of the present disclosure. As shown in FIG. 1, the method 100 includes developing content in step 110, determining relevant information types in step 120, associating content with information types in step 130, generating associated content in step 140, suggesting content in step 150, and publishing content in step 160.

In at least one embodiment of the present disclosure, an enterprise creating communications for its customers and potential customers will develop content in one or more web-based languages in step 110. In at least one embodiment of the present disclosure, the enterprise will create such content in a Guide Template Language. As used in the present disclosure, the Guide Template Language refers to a language that supports association of content with one or more contexts and data sources, and/or the ability to create tags, data expressions, and other template-language constructs. In at least one embodiment of the present disclosure, the Guide Template Language may act as a superset of one or more template languages and, therefore, include at least all of the constructs and functionality of the one or more template languages, such as, for example, the Guide Template Language may be a superset of the Handlebars template language, which is itself, a superset of the Mustache template language. In this example, by acting as a superset of the Handlebars template language, the Guide Template Language may support expressions, precompilation, paths, helpers, and other constructs available in the Handlebars and/or Mustache template languages.

In at least one embodiment of the present disclosure, an enterprise may create content by developing such content in the Guide Template Language. In such an embodiment, the enterprise may input code to render images, video, information, and other types of content within a communication. In at least one embodiment of the present disclosure, the enterprise may input code that requests information from a viewer of the communication. In such an embodiment, the code, when viewed in a web browser, may render a communication that requests various types of information from a viewer, such as, for example, an email address, contact information, demographic information, and other types of information.

For example, an enterprise intending to create a communication that asks a user to sign up for the enterprise's newsletter may input code that, when viewed by a web browser, will render content asking the user to input an email address or other contact information through a text box or other input field. In this example, the enterprise may use the Guide Template Language to associate the input field with a column in a data store, such as, for example, an email address column in a row that captures contact information. As used in the present disclosure, a data store refers to, but is not limited to, a relational database, a comma-separated value file, a flat file, a data structure, a linked list, or other information-storing system.

In at least one embodiment of the present disclosure, the Guide Template Language supports the use of tags. In such an embodiment, a tag is an identifier that provides a processing directive to a rendering engine, such as a web browser, which, when evaluated by the rendering engine performs a substitution of information for a tag based on how the tag is defined. A tag could be used to reference an external data source, to substitute a value from the data source into the output markup, or conditionally process the markup based upon the state of external data. For example, as used in the Guide Template Language, the syntax associated with a tag may follow the criteria set forth in the Handlebars and Mustache template languages.

In at least one embodiment of the present disclosure, the Guide Template Language supports defining one or more data sources or data stores. In such an embodiment, an enterprise may reference an external data source or data store to use when evaluating tags. In such an embodiment, in the event that the enterprise defines a tag and a data source, the enterprise may reference a value stored within the data source in the tag. In such an embodiment, a rendering engine will pull the value from the data source when performing the substitution to render the tag.

In at least one embodiment of the present disclosure, the Guide Template Language will automatically populate a set of common data sources. These common data sources may include, but are not limited to, types of data sources that are generally available to all templates created using the Guide Template Language for an enterprise. In one example, a global data source that stores time values, an FTP location to store information, and other system-wide information that is generally available to an enterprise. In another example, a common data source may include one specific to the enterprise and contain values about the enterprise, such as, for example, an enterprise identifier, the enterprise's common business name, the city in which the enterprise is located, and other information about the enterprise. In another example, a common data source may include that contains contact information about persons in which the enterprise communicates, such as, for example, the enterprise's newsletter distribution list. In this example, the data source may include a contact's email address, cell phone number, social media handle, and other contact information that the enterprise may use to communicate with the contact. It should be appreciated that it is within the scope of the present disclosure to include any generally available data source in the Guide Template Language based on the types of information that an enterprise may commonly need when creating templates.

For example, an enterprise creating a communication using the Guide Template Language that will ask viewers of the communication to input their birthday into the communication may desire to include information about the enterprise in the communication. In this example, the enterprise may include tags using the Guide Template Language that reference a common data source that contains information about the enterprise, such as, for example, the enterprise's address and name. In this example, by including a tag, the enterprise will develop the template quicker than writing out this information manually. In addition, in this example, the enterprise may reuse the created template at a later time even if information about the enterprise has changed, provided that the enterprise has updated the common data source.

In at least one embodiment of the present disclosure, an enterprise may create content by using a GUI, wizard, or other tool that assists the enterprise in creating content visually, such as, for example, the content creator tool shown in FIGS. 3A, 3B, 3C, 3D and 3E. In such an embodiment, the content creator tool assists the enterprise by visually representing at least portions of the content and enabling the enterprise to drag and drop pre-built components into a communication. In such an embodiment, the content creator tool may generate content using the Guide Template Language based on input from the enterprise.

In at least one embodiment of the present disclosure, relevant information types are determined in step 120 based on content developed in step 110. In at least one embodiment of the present disclosure, the enterprise inputs content that contains variables or other references to content within a data store in step 110. In such an embodiment, the Guide Template Language supports automatically determining relevant information types based on content created through the use of one or more tags. In at least one embodiment of the present disclosure, an enterprise may input code that defines one or more variable tags. In at least one embodiment of the present disclosure, a variable tag is an identifier that references a data field within a data environment. In such an embodiment, a rendering engine for the developed content in the Guide Template Language will enumerate over a stack to find the appropriate data source to associate with each variable tag. In such an embodiment, if the rendering engine does not determine a data source, it may generate a default string, empty string, or other pre-defined value to use in the event a data source cannot be matched.

In at least one embodiment of the present disclosure, the method 100 associates content with information types in step 130. In such an embodiment, a rendering engine may associate content defined through the use of one or more tags, such as, for example, the use of variable tags as described above. In such an embodiment, a rendering engine will substitute information stored within a data field of a data store in place of the variable tag.

In an exemplary embodiment, the Guide Template Language supports the use of Data Expressions. As used in the present disclosure, a Data Expression is a type of tag with an identifier that is evaluated against a set of data sources to automatically determine what data source is appropriate to associate with the identifier. In such an embodiment, the enterprise may define a tag with a data extension or information type using a Data Expression without defining a data source. In such an embodiment, the method 100 automatically evaluates the available data sources to the enterprise to associate the tag with the appropriate data source in step 130.

In at least one embodiment of the present disclosure, data sources are evaluated to determine whether the data extension or information type input by the enterprise in the tag is contained within any data source available to the enterprise.

Data sources available to the enterprise may include, but are not limited to, standard data sources within a context defined or attached by the enterprise and any data source in which information owned by the enterprise is stored with a defined data model.

In at least one embodiment of the present disclosure, the data model defines the types and reference names of data extensions, contact attributes, and other information types available within a data store to the enterprise. In such an embodiment, the Data Expression may match the data extension or information type used within a tag in the event that the data extension or information type is referenced in the defined data model. In at least one embodiment of the present disclosure, in the event that an appropriate data extension or contact attribute within a defined data model is located or an appropriate data source is identified, a rendering engine will generate the associated content by substituting the tag for the identified information in step 140.

In at least one embodiment of the present disclosure, the defined data model may include a data model that is specific to an enterprise. In such an embodiment, the enterprise may reference information by referencing an identifier or name of the information. In such an embodiment, the Guide Template Language identifies how to access the data, sort the data, and filter the data based on the context of the request. In such an embodiment, an enterprise referencing a variable or identifier within a Data Expression will instruct the Guide Template Language to automatically locate, sort, and filter the data associated with the variable or identifier based on the context of the request by the enterprise. It should be appreciated that this process may occur within a browser at the time of rendering content based on the Guide Template Language and/or occur on a server prior to serving content to the rendering engine.

For example, Company A is an enterprise that uses ExactTarget to assist in creating and sending communications on behalf of Company A. In this example, ExactTarget stores information about Company A's contacts and customers within a defined data model. In addition, in this example, ExactTarget makes available to Company A a certain set of common data sources to reference in the Guide Template Language as Company A creates content. In this example, one of the common data sources may include information about Company A, such as, for example, Company A's mailing address.

In this example, Company A desires to create a communication using the Guide Template Language that asks viewers of the communication to input their age into a form. In this example, Company A creates the communication using the Guide Template Language. In this example, Company A includes tags within the communication that reference the common data source to include Company A's mailing address when rendering the communication.

In addition, Company A desires to include information indicating the viewer's birthday stored within ExactTarget's defined data model without knowing the exact data source name or reference to use in the Guide Template Language. In this example, Company A creates a tag that defines a Data Expression which includes the contact attribute of "Birthday". In this example, the Data Expression indicates that a substitution should occur in the event that the contact attribute of "Birthday" can be located within the ExactTarget defined data model. In the event that "Birthday" is a contact attribute within the ExactTarget defined data model, a rendering engine will substitute the tag for the value associated with birthday in the defined data model for the specific viewer.

In at least one embodiment of the present disclosure, the method 100 suggests pre-built content to the enterprise in step 150. In such an embodiment, in the event that the enterprise inputs content that will create a common type of communication in which there is already a template for such communication, the system will suggest content for the enterprise to use in step 150. In such an embodiment, the suggested content will be written in the Guide Template Language and reference data sources, data extensions, and data types owned by the enterprise such that the enterprise may quickly and efficiently create new communications based on pre-defined communication templates.

In at least one embodiment of the present disclosure, the content will be suggested in step 150 by evaluating the content developed by the enterprise against a set of pre-build templates to determine whether the enterprise is referencing data extensions or contact attributes within a defined data model that are referenced in a pre-built template. In at least one embodiment of the present disclosure, the enterprise inputs content into a system, and the system evaluates the content against content within the pre-built templates. In such an embodiment, in the event that the system identifies that the content is associated with data extensions or contact attributes within a defined data model that is referenced in a pre-built template, the system will suggest that the enterprise use the pre-built template in place of the developed content.

In at least one embodiment of the present disclosure, the method 100 will publish the content in step 160. In such an embodiment, the content that is published is the content chosen by the enterprise which may include the content developed by the enterprise alone or the suggested content in step 150. In at least one embodiment of the present disclosure, the content is published by sending the content in a communication to a recipient, publishing the content on a webpage, or generally making the content available to one or more desired viewers.

Referring now to FIG. 2, there is shown at least one embodiment of the components of the system for generating data-rich templates 200 according to the present disclosure. System 200 comprises first remote device 220, host server 260, database 280, and computer network 290. For purposes of clarity, only one first remote device 220 is shown in FIG. 2. However, it is within the scope of the present disclosure that the system 200 may have two or more first remote devices 220 operating at the same time. In the embodiment shown in FIG. 2, first remote device 220 is operated by an enterprise. It should be noted that at least in one embodiment of the present disclosure, the first remote device 220 may not be remote from the other components of the system 200 but may be part of or locally connected to the host server 260 and the database 280.

The first remote device 220 may be configured to send content to the host server 260 via the computer network 290. In addition or alternatively, the first remote device 220 may be configured to access and utilize an application hosted on host server 260 to build content. First remote device 220 includes one or more computers, computing devices, or systems of a type well known in the art, such as a mainframe computer, workstation, personal computer, laptop computer, hand-held computer, cellular telephone, or personal digital assistant. First remote device 220 comprises such software, hardware, and componentry as would occur to one of skill in the art, such as, for example, one or more microprocessors, memory systems, input/output devices, device controllers, and the like. First remote device 220 also comprises one or more data entry means (not shown in FIG. 2) operable by users of first remote device 220 for data entry, such as, for example, a pointing device (such as a mouse), keyboard, touchscreen, microphone, voice recognition, and/or other data entry means known in the art. First remote device 220 also comprises a display means (not shown in FIG. 2) which may comprise various types of known displays such as liquid crystal diode displays, light emitting diode display, and the like upon which information may be display in a manner perceptible to the user.

As described above, the host server 260 may be configured to receive content from the first remote device 220, host an application for the first remote device 220 to build electronic messages, and/or establish one or more electronic messages. In at least one embodiment, the host server 260 accesses the database 280 to evaluate tags, Data Expressions, and other substitution elements contained with content using the Guide Template Language as described in the method 100. The host server 260 is configured to carry out one or more of the steps of method 100 described above. For example, the host server 260 may perform steps 110, 120, 130, 140, 150, and 160. The first remote device 220 is configured to provide input to the host server 260 to carry out one or more of the steps of method 100 described above. For example, the content created by the enterprise in step 110 may include content input into the first remote device 220. Host server 260 comprises one or more server computers, computing devices, or systems of a type known in the art. Host server 260 further comprises such software, hardware, and componentry as would occur to one of skill in the art, such as, for example, microprocessors, memory systems, input/output devices, device controllers, display systems, and the like. Host server 260 may comprise one of many well-known servers, such as, for example, IBM's AS/400 Server, IBM's AIX UNIX Server, or MICROSOFT's WINDOWS NT Server. In FIG. 2, host server 260 is shown and referred to herein as a single server. However, host server 260 may comprise a plurality of servers or other computing devices or systems interconnected by hardware and software systems know in the art which collectively are operable to perform the functions allocated to host server 260 in accordance with the present disclosure.

The database 280 is configured to store data extensions and contact attributes in the defined data model and information stored within common data sources. Database 280 is "associated with" host server 260. According to the present disclosure, database 280 can be "associated with" host server 260 where, as shown in the embodiment in FIG. 2, database 280 resides on host server 260. Database 280 can also be "associated with" host server 260 where database 280 resides on a server or computing device remote from host server 260, provided that the remote server or computing device is capable of bi-directional data transfer with host server 260. In at least one embodiment, the remote server or computing device upon which database 280 resides is electronically connected to host server 260 such that the remote server or computing device is capable of continuous bi-directional data transfer with host server 260.

For purposes of clarity, database 260 is shown in FIG. 2, and referred to herein as a single database. It will be appreciated by those of ordinary skill in the art that database 260 may comprise a plurality of databases connected by software systems of a type well known in the art, which collectively are operable to perform the functions delegated to database 260 according to the present disclosure. Database 260 may comprise a relational database architecture or other database architecture of a type known in the database art. Database 260 may comprise one of many well-known database management systems, such as, for example, MICROSOFT's SQL Server, MICROSOFT's ACCESS, or IBM's DB2 database management systems, or the database management systems available from ORACLE or SYBASE. Database 260 retrievably stores information or documents that is communicated to database 260 from first remote device 220 or through computer network 290.

First remote device 220 communicates with host server 260 via computer network 290. The communication between first remote device 220 and host server 260 may be bi-directional. Computer network 290 may comprise the Internet, but this is not required.

Referring now to FIGS. 3A, 3B, 3C, 3D, and 3E, it is shown a graphical user interface to create data-rich templates according to at least one embodiment of the present disclosure. As shown in FIG. 3A, it is shown a graphical user interface 300 to create data-rich templates according to at least one embodiment of the present disclosure. As shown, in FIG. 3A, the graphical user interface 300 contains a visual representation of various parts of a communication that an enterprise may create. As shown in FIG. 3A, an example of the types of sections within a communication that may be created by an enterprise are a header 301, a call to action section 302, an offer 303, a spotlight article 304, a secondary article 305, and a footer 306. It should be appreciated that it is within the scope of the present disclosure for a communication created using the Guide Template Language to contain any number or combinations of sections and content and that the graphical user interface 300 shown in FIG. 3A is an example.

Figure 3B:
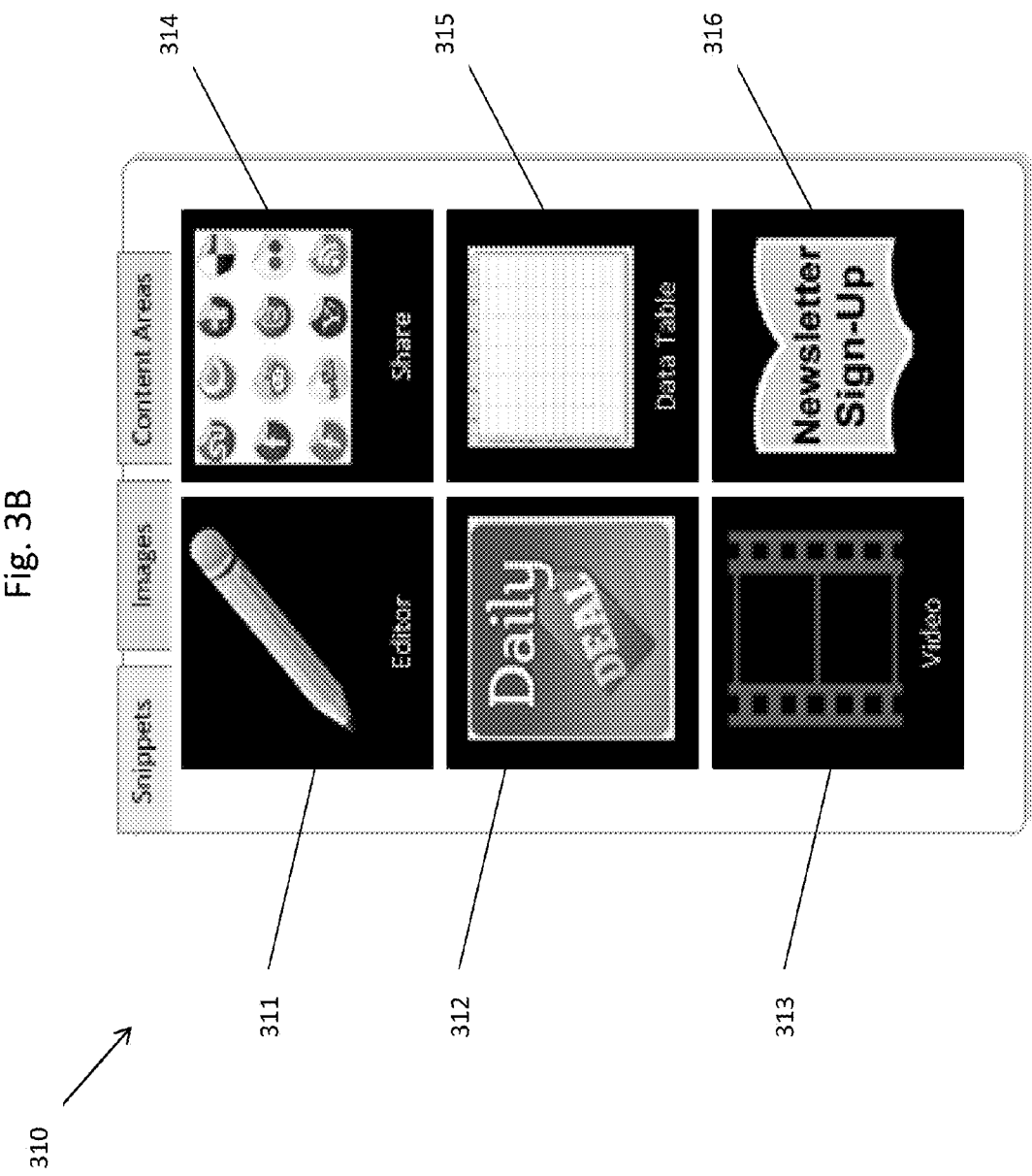

As shown in FIG. 3A, in at least one embodiment of the present disclosure, an enterprise creating a communication using the Guide Template Language may use a graphical user interface 300 to populate the communication. In such an embodiment, the enterprise may populate sections within the graphical user interface 300 by selecting various components from a component screen 310 as shown in FIG. 3B. As shown in FIG. 3B, an enterprise may select components from a component list 310 to populate a communication. As used in the present disclosure, components refers to, but is not limited to, pre-built templates using the Guide Template Language to create communications or parts of communications for an enterprise. As shown in FIG. 3B, examples of the types of components available to an enterprise include an editor component 311, a deal component 312, a video component 313, a social-media interaction component 314, a data table component 315, and a newsletter signup component 316. It should be appreciated that it is within the scope of the present disclosure that any number or type of pre-built components may be included and presented to the user in the component list 310 and that the components shown on FIG. 3B are examples.

Figure 3C:
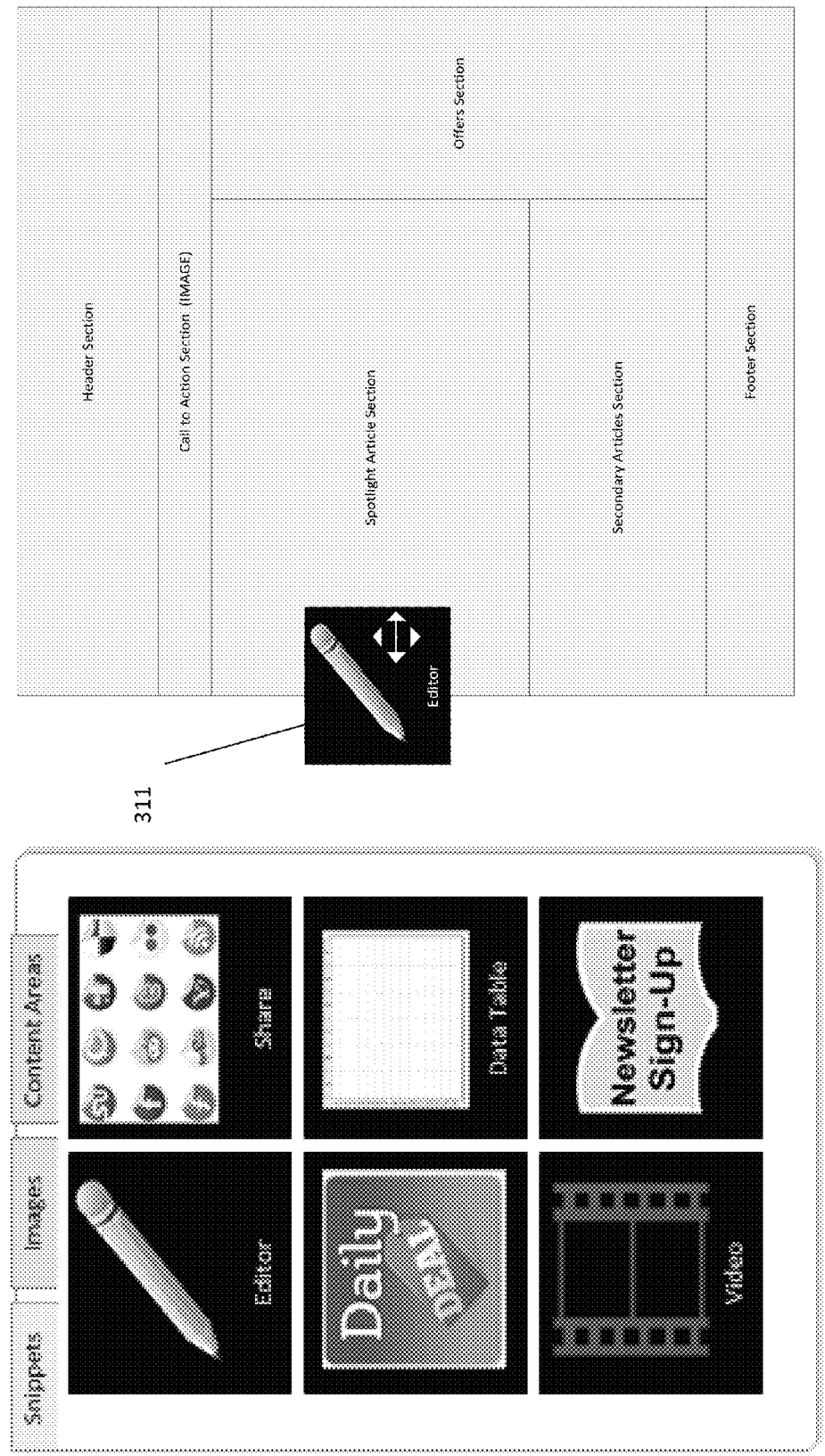
Figure 3D:
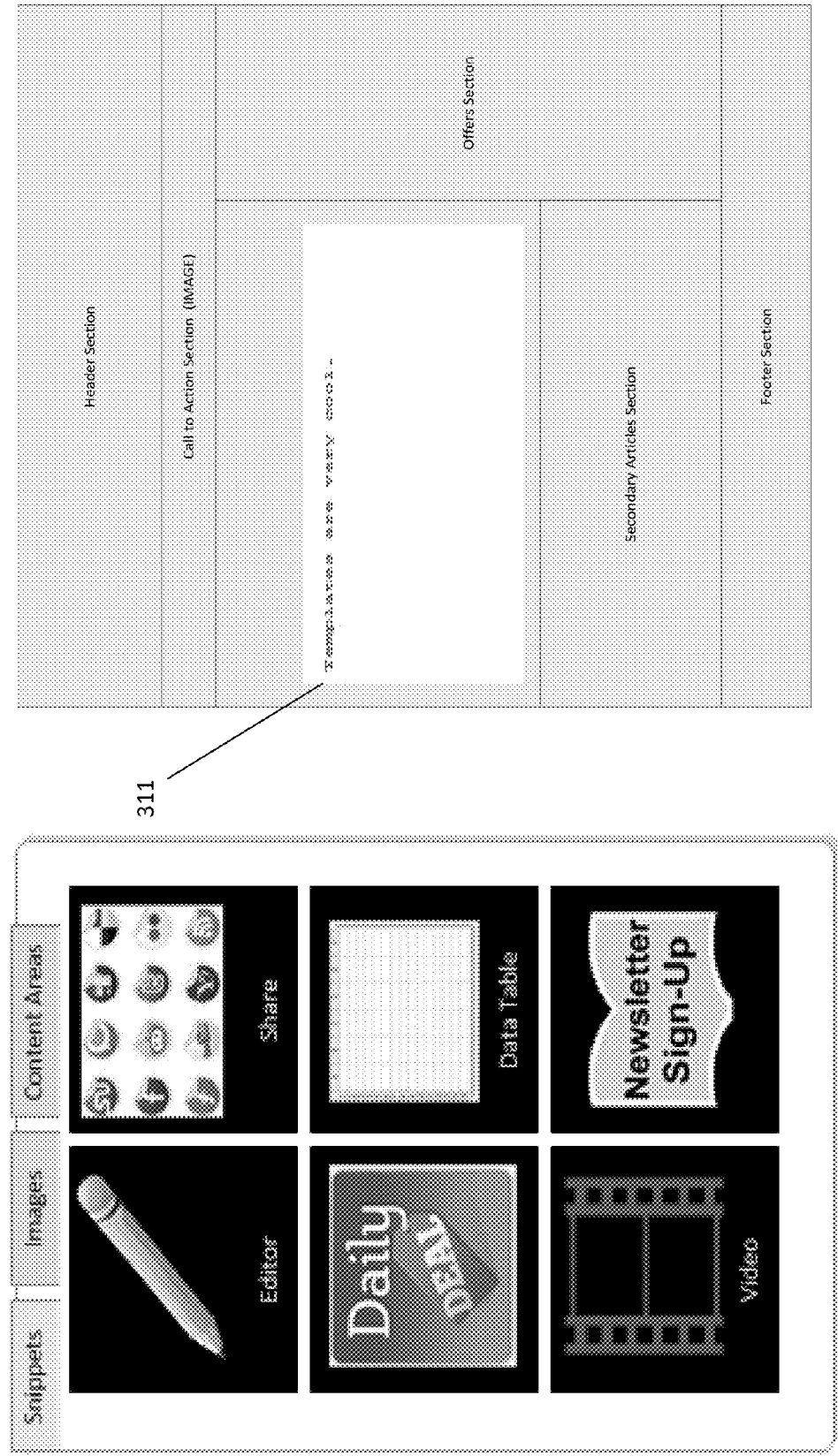
Figure 3E:
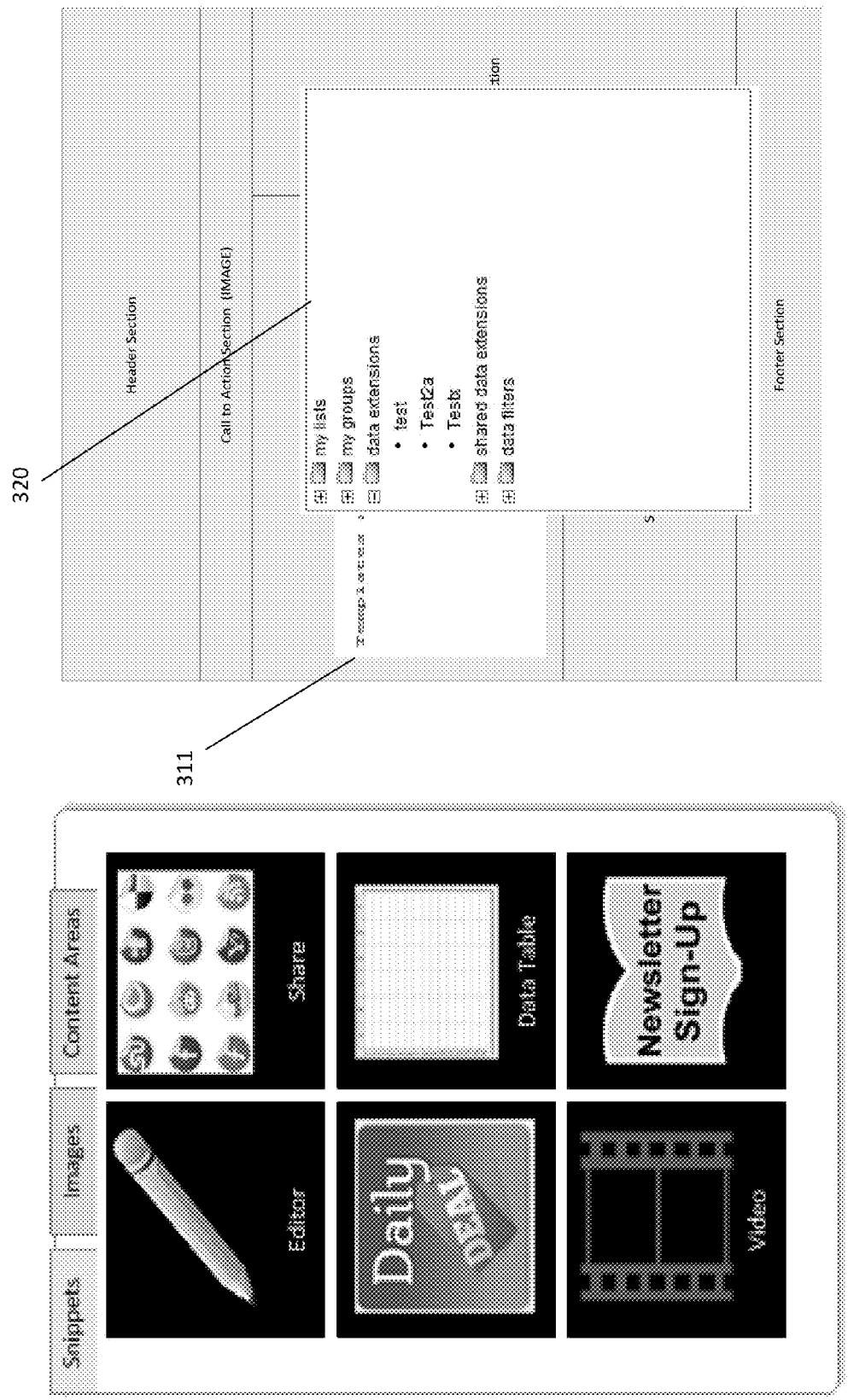

In at least one embodiment of the present disclosure, an enterprise may select one or more components from the component list 310 to include in a communication. As shown in FIG. 3C, an enterprise may drag the editor component 311 from the component list to the graphical user interface. Referring now to FIG. 3D, after dragging the editor component 311 from the component list to the graphical user interface, the editor component 311 populates within a section of the graphical user interface, and the enterprise may further edit the pre-built template of the editor component 311 as they desire for the communication. It should be appreciated that the enterprise may drag any component from the component list to any section of the graphical user interface to be placed in the communication and that the example shown in FIG. 3C and FIG. 3D is merely an example. Referring now to FIG. 3E, in at least one embodiment of the present disclosure, the enterprise may further alter the editor component 311 by defining data sources and adding data extensions.

In at least one embodiment of the present disclosure, the graphical user interface 300 shown in FIG. 3A and the component list 310 shown in FIG. 3B are served by the host server 2260 shown in FIG. 2 and viewed by an enterprise from the first remote device 220. It should be appreciated that the data sources and data extensions shown in the editor component 311 in FIG. 3E may be populated from entries in the database 280. In at least one embodiment of the present disclosure, as the enterprise manipulate the graphical user interface 300 shown in FIG. 3A, the system 200 executes varies steps in the method 100 to create a communication.

While this disclosure has been described as having various embodiments, these embodiments according to the present disclosure can be further modified within the scope and spirit of this disclosure. This application is therefore intended to cover any variations, uses, or adaptations of the disclosure using its general principles. For example, any methods disclosed herein represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains.

The invention claimed is:

1. A computerized method for correlating template data to select contextually relevant content, the method comprising:
receiving, at a server, a request from a consumer device to serve a template, the template comprising at least:
a first tag comprising an attribute of data to be substituted for the first tag; and
a second tag referencing a common data source storing information about an enterprise, the second tag including an identifier of data in the common data source to be substituted for the second tag;
determining that the attribute exists within a data model of a first database;
selecting the first database from among a plurality of databases based upon the first tag and the existence of the attribute within the data model of the first database;
selecting a first content in the first database based at least in part on a correlation between the template and the first tag;
substituting the first tag with the first content;
selecting a second content from the common data source based upon the second tag;
substituting the second tag with the second content; and
transmitting the template from the server to the consumer device.

2. The method of claim 1, wherein the correlation provides a context to the at least one first tag based on the template.

3. The method of claim 1, wherein the selecting the first content step includes selecting the first content from a plurality of content stored within a plurality of databases.

4. The method of claim 1, wherein the at least one first tag comprises a data expression.

5. The method of claim 1, further comprising:
receiving a profile information through submission of the template from the consumer device; and
inserting the profile information into the first database.

6. The method of claim 1, wherein the request is generated from the consumer device by a mobile application or web browser.

7. The method of claim 1, wherein the first content references an application programming interface.

8. The method of claim 7, further comprising the consumer device rendering the template in a web browser or mobile application by retrieving an information from the application programming interface.

9. The method of claim 1, further comprising selecting the first database based upon a data extension or an information type of the first tag.

10. The method of claim 1, wherein the at least one tag does not identify the first database, and the method further comprises evaluating the plurality of databases to determine whether a data extension or information type in the first tag is contained in any of the plurality of databases.

11. The method of claim 1, wherein the common data source is a second database of the plurality of databases.

12. The method of claim 1, wherein the plurality of databases is managed by a first entity separate from the enterprise, and the first entity provides access to data stored in the plurality of databases via the template.

13. The method of claim 1, further comprising:
receiving input from the enterprise to create a communication, the input comprising a reference to a data extension, data attribute, or a combination thereof;
determining that the input references a data extension, a data attribute, or a combination thereof in a defined data model referenced in a pre-built template; and
suggesting the pre-built template to the enterprise.

14. A system for creating a data-rich template comprising:
a plurality of databases; and
a host server operably connected to a first remote device and the plurality of databases, wherein the host server is configured to:
receive a request from the first remote device to serve a template, wherein the template contains at least:
a first tag comprising an attribute of data to be substituted for the first tag; and
a second tag referencing a common data source storing information about an enterprise, the second tag including an identifier of data in the common data source to be substituted for the second tag;
determine that the attribute exists within a data model of a first database of the plurality of databases;
select the first database from among the plurality of databases based upon the first tag and the existence of the attribute within the data model of the first database;
process the request by selecting a first content from the first database based on a correlation between the template and the first tag and selecting a second content from the common data source based upon the second tag;
substitute the first tag with the second content;
substitute the second tag with the second content; and
transmit the template to the first remote device.

15. The system of claim 14, wherein the at least one first tag comprises a data expression.

16. The system of claim 14, wherein the host server is further configured to select the first content from a plurality of content in the plurality of databases based on a correlation between the template and the at least one first tag.

17. The system of claim 14, wherein the host server is further configured to receive a profile information from the first remote device through submission of the template.

18. The system of claim 17, wherein the host server is further configured to insert the profile information into the first database.

19. The system of claim 14, wherein the request is generated by a web browser or mobile application on the first remote device.

20. The system of claim 14, wherein the host server is further configured to select the first database based upon a data extension or an information type of the first tag.

21. The system of claim 14, wherein the first tag does not identify the first database, and the host server is further configured to evaluate the plurality of databases to determine whether a data extension or information type in the first tag is contained in any of the plurality of databases.

* * * * *